United States Patent [19]

Nomura et al.

[11] Patent Number: 4,743,409

[45] Date of Patent: May 10, 1988

[54] PROCESS FOR PREPARING A SUBSTRATE FOR OPTICAL RECORDING MEDIA

[75] Inventors: Shigeru Nomura, Itami; Tetsuo Kadoya, Tokyo; Takeo Kinoshita, Osaka, all of Japan

[73] Assignee: Sekisui Kagaku Kogyo Kabushiki Kaisha, Osaka, Japan

[21] Appl. No.: 872,914

[22] Filed: Jun. 10, 1986

Related U.S. Application Data

[63] Continuation-in-part of Ser. No. 867,590, May 27, 1986, abandoned, Continuation of Ser. No. 671,079, Nov. 13, 1984, abandoned.

[51] Int. Cl.$^4$ .............................................. B29D 11/00
[52] U.S. Cl. .................................... 264/1.3; 264/106; 264/331.22
[58] Field of Search ..................... 264/1.3, 106, 331.22

[56] References Cited

U.S. PATENT DOCUMENTS 3,926,918 12/1975 Shibata et al. ........................ 525/61
3,963,618  6/1976 Muir ...................................... 525/61

FOREIGN PATENT DOCUMENTS 0602855  8/1960 Canada ................................. 525/61
0138091 10/1979 Japan ................................... 525/61
0383045 11/1932 United Kingdom ................. 525/61
0682194 11/1952 United Kingdom ................. 525/61

*Primary Examiner*—Joseph L. Schofer
*Assistant Examiner*—J. M. Reddick
*Attorney, Agent, or Firm*—Wenderoth, Lind & Ponack

[57] ABSTRACT

A process for preparing a substrate for optical recording media which comprises injection-molding a polyvinylacetal resin resulting from acetalization of polyvinylalcohol to a degree of at least 60 mole % with at least one acetalizing agent selected from the group consisting of aliphatic aldehydes, alicyclic aldehydes, aromatic aldehydes and heterocyclic aldehydes.

2 Claims, 3 Drawing Sheets

WEIGHT LOSS OF RESINS ON HEATING

PROCESS FOR PREPARING A SUBSTRATE FOR OPTICAL RECORDING MEDIA

This application is a continuation-in-part application of Ser. No. 867,590, filed on May 27, 1986, which is a continuation of Ser. No. 671,079 filed on Nov. 13, 1984, both now abandoned.

This invention relates to a process for preparing a substrate for use in optical recording media in which recording and reproduction of information are carried out by the reflection or transmission of laser beams. More specifically, the invention relates to a substrate for optical recording media, which has excellent transparency, moisture resistance, moldability and heat resistant, namely, is highly resistance against thermal deformation up to high temperature, and is free from birefringence.

The optical recording media typically comprise a flat substrate and formed on at least one surface thereof, rows of minute depressions, or helically or concentrically extending pre-grooves and a recording layer on the pre-grooves. Laser beams are focused on the minute depressions or the recording layer. The reflected or transmitted light is read and the information is reproduced.

Such optical recording media have been used as video discs, audio discs, document disc files, computer information disc files, etc. Generally, a poly(methyl methacrylate)-type resin or a polycarbonate-type resin is used as a substrate for the optical recording media because of its requirement for transparency.

The poly(methyl methacrylate)-type resin has excellent moldability and strength, but inferior moisture resistance. At high temperatures and humidities, therefore, molded articles from it undergo warping, or develop cracks while they repeatedly absorb moisture and dry. Moreover, their impact strength is reduced. Japanese Laid-Open patent publications Nos. 5354/1983 and 13652/1983 disclose resins having improved moisture resistance obtained by copolymerizing several kinds of monomers such as methacrylates, styrene and cyclohexane methacrylate. However, so long as their major component is polymethacrylate, they have still unsatisfactory moisture resistance.

The polycarbonate-type resin, on the other hand, has low surface hardness and is susceptible to injury. In addition, it has poor moldability, and because the orientation during molding remains in the molded articles, the articles have great birefringence, and therefore cannot be used for large storage capacity image-type discs, large storage capacity document discs, and large storage capacity computer discs.

Other resins having excellent transparency have a high birefringence, and are unsuitable for use in such discs.

The injection molding process and casting process have been taken up to obtain a disc-like transparent substrate for the optical information recording media. The latter process comprises charging a liquid monomer into a pre-shaped mold to carry out the polymerization and is used for polymethacrylate resins, but is not practical since its polymerization time is quite long, its process is complicated and dirt is likely to be included.

The former injection molding process is most generally used and has an advantage that a large quantity of discs can be obtained simply. The injection molding machine consists of a hopper, a resin melting portion and a mold portion. A resin fed from the lower portion of the hopper is filled in the space between a screw and a cylinder, rubbed by the revolving of the screw, melted and extruded out of the end of the screw. The molten resin extruded out of the end of the screw is injected radially into the mold through a spool located in the middle of the mold, cooled and molded into a form of a circular plate, whereby one cycle of the molding is completed.

The cause for birefringence is that the orientation during molding remains in the substrate for the disc. If the injection molding is carried out at higher temperatures than that for an ordinary molding, this orientation is removed. The molten resin is introduced through the middle spool and spread in the direction from the inner circumference to outer circumference. Accordingly, the orientation is likely to remain in the direction of the radius and especially remains to the greatest extent in the inner circumference. It is preferable to carry out the injection at a temperature of resin higher than that for an ordinary molding. The reason for it is explained as follows. The period of time for injection molding (from the beginning of the introduction of the molten resin into the mold to the completion of its charging) is very as short as not longer than 1 second. If this period of time is longer, the resin introduced in the beginning is cooled in the mold and a predetermined amount of the resin cannot be filled. It is required to maintain a high temperature for a certain period of time in order to weaken the orientation deveoped during this period of time. Accordingly, the higher the temperature of resin in a molding machine is, the lower the birefringence becomes. On the other hand, if the molding is continued at a high temperature, the resin is decomposed by heat and burned during molding, which has undesirable influences on a disc for the optical recording media such as flaws and coloring. Further, the property inherent in resin is of an important factor to birefringence. The resins can be classified into one resin group in which the orientation remains to a greater extent but the refringence is low and the other resin group in which the orientation remains to a smaller extent but the refringence is high. A typical example of the former is polymethylmethacrylate, and typical examples of the latter include many resins such as polystyrene, polycarbonate, etc.

Accordingly, when the substrate for optical information recording media is prepared by the injection molding, polymethylmethacrylate is easy to mold and polycarbonate is difficult to mold.

It is an object of this invention therefore to provide a process for preparing a substrate for optical recording media, which eliminates the aforesaid defects of the prior art, and can be used in optical discs of the large storage capacity recording type, and the rerecordable type.

Another object of this invention is to provide a process for preparing a substrate for optical recording media, which has excellent transparency, moldability, moisture resistance, and heat resistance, and low birefringence.

According to this invention, there is provided a process for preparing a substrate for optical recording media which comprises injection-molding a polyvinylacetal resin resulting from acetalization of polyvinylalcohol to a degree of at least 60 mole % with at least one acetalizing agent selected from the group consisting of aliphatic aldehydes, alicyclic aldehydes, aromatic aldehydes and heterocyclic aldehydes.

The present invention is based on the inventors' discovery that a resin having excellent moisture resistance can be obtained by increasing the degree of acetalization of a polyvinylacetal resin having high transparency, and that a resin having excellent heat resistance can be obtained by selecting the type of an aldehyde to be used in acetalization.

The polyvinylacetal resin is obtained by acetalizing polyvinylalcohol with an aldehyde in the presence of an acid catalyst. If the degree of acetalization is low, the resulting polyvinylacetal resin has high hydroscopicity because of the remaining hydroxyl groups. The polyvinylacetal resin forming the substrate of this invention has excellent moisture resistance because it has a degree of acetalization of at least 60 mole %, preferably at least 65 mole %. To obtain such a polyvinylacetal resin, the starting polyvinylalcohol preferably has a high purity.

The polyvinylalcohol has a degree of saponification of at least 80 mole %, preferably at least 95 mole %. In other words, it has not more than 20 mole %, preferably not more than 5 mole %, of residual acetyl groups. If the percentage of the residual acetyl groups is high, the transparency of the resulting polyvinylacetal resin is undesirably reduced. The polyvinylalcohol has a degree of polymerization of 100 to 2,500, preferably 300 to 1,500. If its degree of polymerization is below 100, the resulting polyvinylacetal resin has drastically reduced impact strength and cannot withstand practical use. Furthermore, its heat resistance and moisture resistance tend to be degraded. If, on the other hand, its degree of polymerization exceeds 2,500, an injection-molded article prepared from the resulting polyvinylacetal resin undesirably has great birefringence. At least one among an alicylcic aldehyde, an aromatic aldehyde and a heterocyclic aldehyde is used as an acetalizing agent for polyvinyl alcohol. In addition to the above alicyclic aldehyde, aromatic aldehyde and heterocyclic aldehyde, for example, there in combination may be used a formaldehyde, acetaldehyde, propylaldehyde, n-butylaldehyde, isobutylaldehyde, decylaldehyde and dodecylaldehyde. These aldehydes may be used singly or in combination.

Examples of the alicyclic aldehydes include saturated aldehydes such as cyclohexanealdehyde, trimethyl cyclohexanealdehyde, dimethylcyclohexanealdehyde, methylcyclohexanealdehyde, cyclopentanealdehyde, methylcyclopentanealdehyde, decahydro-beta-naphthaldehyde and cyclohexaneacetaldehyde; terpene-type aldehydes such as alpha-camphorenealdehyde, phellandral, cyclocitral, trimethyltetrahydrobenzaldehyde, alpha-pyrronenealdehyde, myrtenal, dihydromyrtenal and camphenilanealdehyde; and unsaturated aldehydes such as 4-methylcyclohexenealdehyde and 3-methylcyclohexenealdehyde.

Examples of the aromatic aldehyde include benzaldehyde, phenylacetaldehyde, phenylpropylaldehyde, tolualdehyde, dimethylbenzaldehyde, cumenealdehyde, and naphthylaldehyde.

Examples of the heterocyclic aldehydes are aldehydes having a furane ring such as furfural and 5-methylfurfural.

The above alicyclic, aromatic and heterocyclic aldehydes may respectively be used singly or in combination.

When the alicyclic, aromatic or heterocyclic aldehyde is used as the acetalizing agent, it should be added in an amount sufficient to acetalize at least 5 mole % of the polyvinylalcohol. If it is less than 5 mole %, sufficient heat resistance cannot be obtained. The acetalizing agent may be composed only of the alicyclic, aromatic or heterocyclic aldehyde.

The polyvinylacetal resin may be prepared by an ordinary method such as the dissolving method, the homogeneous method or the precipitation method. Or it may be prepared by saponifying polyvinylacetate and subsequently acetalizing the resulting product.

The polyvinylacetal resin so prepared is molded by ordinary methods such as injection molding or compression molding. As required, ordinary additives such as age resistors, antioxidants, heat stabilizers, ultraviolet absorbers and lubricants may be used in the molding process.

Since the substrate in accordance with this invention is composed of the polyvinylacetal resin having such a high degree of acetalization, it has excellent moisture resistance, and therefore does not undergo warpage or strain during storage. Furthermore, because the resin has excellent moldability, fine pits of a stamper and pre-grooves can be reproduced, and the strain or orientation during molding does not remain. For this reason, erroneous recording or reading of information does not occur. The substrate of this invention is applicable to a wide range of optical recording media including large storage capacity image-type discs, large storage document discs, and large storage capacity computer discs.

The use of the alicyclic, aromatic or heterocyclic aldehyde for the acetalization brings about the advantage that the substrate obtained also has excellent heat resistance.

Figure 1:
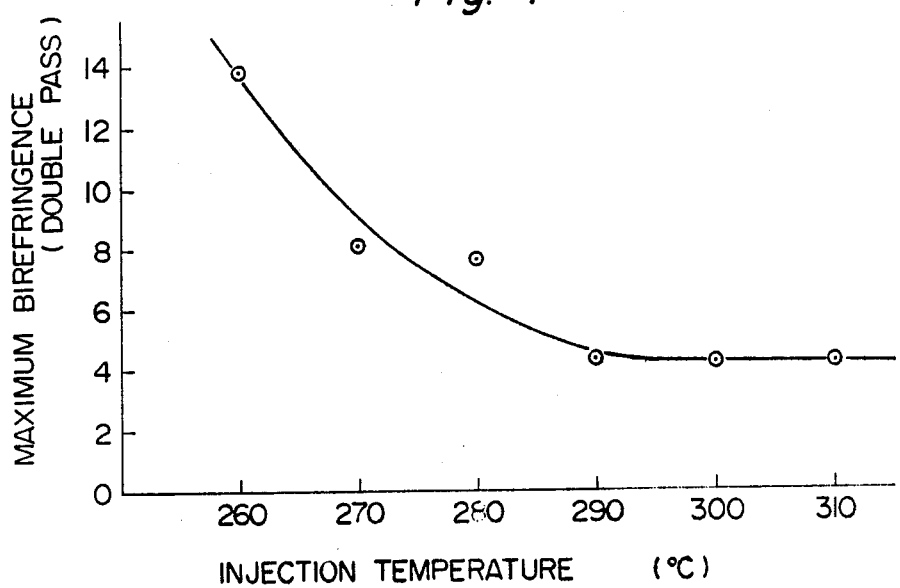
FIGS. 1 and 2 depict the relationship between injection molding temperature and the maximum birefringence for certain resins of Examples of the present specification.

The following examples illustrate the present invention more specifically.

EXAMPLE 1

(A) Preparation of polyvinylacetal

One hundred grams of polyvinylalcohol having a degree of saponification of 99.2 mole % and a degree of polymerization of 2,200 was dissolved in 880 g of distilled water, and 57 g of concentrated hydrochloric acid was added. While the mixture was maintained at 14.4° C., 57.3 g of isobutylaldehyde was added dropwise over 15 minutes. Ten minutes after the addition, polyvinylbutyral precipitated. This reaction system was heated and maintained at 40° C. for 10 hours. The temperature was then lowered, and it was neutralized with sodium bicarbonate. The resulting polyvinylbutyral was washed with water, and dried at 70° C. for 48 hours. The degree of acetalization of this resin was measured.

(B) Molding of the polyvinylacetal resin and evaluation of its properties

The resin obtained as described in section (A) was injection-molded at a cylinder temperature of 195° C. and a molding temperature of 60° C. The warpage after water absorption, percentage water absorption, total light transmittance, haze value and birefringence of the resulting injection-molded plate (1.2 mm×120 mm×120 mm) were measured by the methods shown below.

The results obtained in Examples 1 to 8 and Comparative Example 1 are summarized in Table 1.

(1) Warpage after water absorption

Aluminum was vapor deposited on one surface of the molded plate, and a protective coating was further applied to shut off intrusion of water from the vapor-deposited layer. This sample was immersed in water at 20° C., and its warpage at the central portion was measured 72 hours later.

(2) Water absorption

The molded plate not subjected to the vapor deposition treatment was immersed in water at 20° C., and the weight of the sample after 72 hours was measured. The percentage of an increase in weight was calculated.

(3) Total light transmittance

Measured in accordance with the method of ASTM D-1003.

(4) Haze value

Measured in accordance with the method of ASTM D-1003.

(5) Presence or absence of birefringence

The molded plate not subjected to the vapor deposition treatment was interposed between two polarizing plates. Visible light was transmitted through it, and the presence or absence of birefringence was examined by observing the interference fringe.

(6) Degree of acetalization

Measured in accordance with JIS K-6728, 5.5.2. The same method was used in Examples 2, 6, 8, 16 and 17 in which the acetalization was effected by using a single aldehyde.

When two or more aldehydes were used as in Examples 3 to 5, 7, 9 to 14, 16 and 18, the aldehydes were treated with hydroxylamine hydrochloride to convert them to the corresponding oximes which were quantitatively determined by gas chromatography in accordance with JIS K-6728, 5.5.2. The operating conditions for gas chromatography were as follows:

Gas chromatoigraphic device: GC6AM made by Shimazdu Seisaku Sho, K.K. (FID method)
Column: PEG 6000
Column temperature: 100°–180° C., fixed temperature method (temperatures at which two oximes can be separated differ)
Carrier gas: nitrogen
Flame gas: hydrogen/air

EXAMPLE 2

Example 1 was repeated except that 69.5 g of isobutylaldehyde was used, and the degree of saponification of the polyvinylalcohol was 99.4%.

EXAMPLE 3

Example 1 was repeated except that the degree of saponification of the polyvinylalcohol was 99.6%, and instead of isobutylaldehyde, 53.1 g of n-butylaldehyde and 6.8 g of formaldehyde were used.

EXAMPLE 4

Example 1 was repeated except that the degree of saponification of the polyvinylalcohol was 98.8%, and instead of isobutylaldehyde, 33.5 g of n-butylaldehyde and 29.9 g of acetaldehyde were used.

EXAMPLE 5

Example 1 was repeated except that the degree of saponification of the polyvinylalcohol was 98.8%, and instead of isobutylaldehyde, 34.9 g of acetaldehyde and 35.7 g of 2-ethylhexylaldehyde were used.

COMPARATIVE EXAMPLE 1

Poly(methyl methacrylate) resin (PARAPET F1000, a product of Kyowa Gas Chemical Co., Ltd.) generally used for an optical disc was molded and evaluated in the same way as in Example 1.

TABLE 1

| Example | Polyvinylalcohol D.P. | Amount of residual acetyl groups (mole %) | Aldehyde | Degree of acetalization (mole %) | Warpage (mm) | Water absorption (%) | Total light transmittance (%) | Haze value | Birefringence |
|---|---|---|---|---|---|---|---|---|---|
| 1 | 2200 | 0.8 | Isobutylaldehyde | 69.5 | 0.6 | 0.8 | 92.3 | 0.6 | None |
| 2 | 2200 | 0.6 | Isobutylaldehyde | 78.4 | 0.3 | 0.5 | 92.8 | 0.6 | None |
| 3 | 2200 | 0.4 | n-Butylaldehyde Formaldehyde | 62.0 12.0 | 0.4 | 0.7 | 91.7 | 0.8 | None |
| 4 | 2200 | 1.2 | n-Butylaldehyde Acetaldehyde | 40.0 42.0 | 0.5 | 0.6 | 92.4 | 0.6 | None |
| 5 | 2200 | 1.2 | Acetaldehyde 2-Ethylhexylaldehyde | 60.0 21.0 | 0.6 | 0.5 | 92.4 | 0.6 | None |
| 6 | 500 | 0.95 | Isobutylaldehyde | 69.1 | 0.7 | 0.8 | 92.1 | 0.4 | None |
| 7 | 500 | 0.95 | Isobutylaldehyde 2-Ethylhexylaldehyde | 30.2 31.0 | 0.5 | 0.6 | 92.2 | 0.7 | None |
| 8 | 500 | 0.95 | Trimethylaldehyde | 60.5 | 0.4 | 0.5 | 92.4 | 0.8 | None |
| Comp. Ex. 1 | — | — | — | — | 2.1 | 1.2 | 91.9 | 0.8 | None |

EXAMPLE 6

Example 1 was repeated except that polyvinylalcohol having a degree of polymerization of 500 and containing 0.95% of residual acetyl groups was used instead of the polyvinylalcohol used in Example 1.

EXAMPLE 7

Example 1 was repeated except that the polyvinylalcohol used in Example 6 was used, and 28 g of isobutylaldehyde and 35.8 g of 2-ethylhexylaldehyde were used instead of 57.3 g of isobutylaldehyde.

EXAMPLE 8

Example 1 was repeated except that the polyvinylalcohol used in Example 6 was used, and instead of isobutylaldehyde, 61.5 g of trimethylacetaldehyde was used.

EXAMPLE 9

(A) Preparation of polyvinylacetal

One hundred grams of polyvinylalcohol having adegree of saponification of 99.2 mole % and a degree of polymerization of 1,500 was dissolved in 880 g of distilled water. Concentrated hydrochloric acid (57 g) was added, and while the mixture was maintained at 14.4° C., 28,8 g of isobutylaldehyde was added dropwise over 15 minutes. Ten minutes after the addition, a precipitate of polyvinylbutyral formed. Cyclohexanealdehyde (63.5 g) was further added, and the reaction mixture was heated and maintained at 40° C. for 10 hours. The temperature was then lowered, and the reaction mixture was neutralized with sodium bicarbonate. The resulting polyvinylacetal was washed with water, and dried at 70° C. for 48 hours.

(B) Molding of polyvinylacetal and evaluation of its properties

The resin obtained in (A) was injection-molded at a cylinder temperature of 255° C. and a die temperature of 75° C. The warpage after water absorption, percent water absorption, total light transmittance, haze value, birefringence and heat distortion temperature of the resulting injection molded plate (1.2 mm×120 mm×120 mm in size) were measured.

The results obtained in Examples 9 to 14 and Comparative Examples 2 and 3 are summarized in Table 2. The heat distortion temperature was measured by the method of ASTM D-648 (18.6 kg/cm$^2$), and the other properties were measured in the same way as in Example 1.

EXAMPLE 10

(A) Preparation of polyvinylacetal

One hundred grams of polyvinylalcohol having a degree of saponification of 99.2 mole % and a degree of polymerization of 1,500 was dispersed in a mixture of 100 g of distilled water and 700 g of isopropanol. Concentrated hydrochloric acid (57 g) was added. With stirring at 65° C., 28.8 g of isobutylaldehyde and 95.8 g of 2,2,6-trimethylcyclohexanealdehyde were added. The mixture was maintained at 65° C. for 15 hours. The reaction mixture was neutralized, and then a large amount of water was added to precipitate the resin. The resulting polyvinylacetal resin was washed with water, and dried at 70° C. for 48 hours.

(B) Molding of the polyvinylacetal resin, and the evaluation of its properties were carried out in the same way as in Example 9.

EXAMPLE 11

(A) Preparation of polyvinylacetal

Example 1 was repeated except that 86.2 g of phellandral was added instead of the cyclohexanealdehyde.

(B) Molding of the polyvinylacetal resin and the evaluation of its properties were carried out in the same way as in Example 9.

EXAMPLE 12

(A) Preparation of polyvinylacetal

Example 9 was repeated except that the amount of isobutylaldehyde was changed to 61.3 g, and the amount of cyclohexanealdehyde was changed to 12.7 g.

(B) Molding of the polyvinylacetal resin and the evaluation of its properties were carried out in the same way as in Example 9.

EXAMPLE 13

(A) Preparation of polyvinylacetal

Example 1 was repeated except that 54.4 g of benzaldehyde was used instead of cyclohexanealdehyde.

(B) Molding of the polyvinylacetal and the evaluation of its properties were carried out in the same way as in Example 9.

EXAMPLE 14

(A) Preparation of polyvinylacetal

Example 9 was repeated except that the amount of isobutylaldehyde was changed to 61.3 g, and 21.8 g of furfural was used instead of the cyclohexanealdehyde.

(B) Molding of the polyvinylacetal and the evaluation of its properties were carried out in the same way as in Example 9.

EXAMPLE 15

(A) Preparation of polyvinylacetal

Example 9 was repeated except that the amount of isobutylaldehyde was changed to 57.3 g, and the cyclohexanealdehyde was not used.

(B) Molding of the polyvinylacetal and the evaluation of its properties were carried out in the same way as in Example 9.

COMPARATIVE EXAMPLE 2

Poly(methyl methacrylate) resin (PARAPET F1000, a product of Kyowa Gas Chemical Co., Ltd.) generally used for an optical disc was molded and evaluated in the same way as in Example 9.

TABLE 2

| Example | Aldehyde | Degree of acetalization (mole %) | Properties of the molded article ||||||
|---|---|---|---|---|---|---|---|---|
| | | | Warpage (mm) | Water absorption (%) | Total light transmittance (%) | Haze value | Birefringence | Heat distortion temperature (°C.) |
| 9 | Isobutylaldehyde<br>Cyclohexanealdehyde | 35<br>50 | 0.4 | 0.6 | 92.3 | 0.9 | None | 83 |
| 10 | Isobutylaldehyde<br>2,2,6-Trimethyl cyclohexanealdehyde | 35<br>50 | 0.2 | 0.3 | 92.4 | 1.0 | None | 91 |
| 11 | Isobutylaldehyde | 35 | 0.2 | 0.3 | 92.6 | 0.8 | None | 84 |

TABLE 2-continued

| Example | Aldehyde | Degree of acetalization (mole %) | Warpage (mm) | Water absorption (%) | Total light transmittance (%) | Haze value | Birefringence | Heat distortion temperature (°C.) |
|---|---|---|---|---|---|---|---|---|
| 12 | Phellandral<br>Iaobutylaldehyde<br>Cyclohexanealdehyde | 50<br>75<br>10 | 0.6 | 0.5 | 92.8 | 0.9 | None | 74 |
| 13 | Isobutylaldehyde<br>Benzaldehyde | 35<br>50 | 0.5 | 0.5 | 91.8 | 1.1 | None | 78 |
| 14 | Isobutylaldehyde<br>Furfural | 75<br>10 | 0.6 | 0.6 | 92.4 | 0.8 | None | 73 |
| Comp. Ex.15 | Isobutylaldehyde | 70 | 0.6 | 0.8 | 92.3 | 0.6 | None | 61 |
| Ex.15 | — | — | 2.1 | 1.2 | 91.9 | 0.8 | None | 82 |

EXAMPLE 16

(A) Preparation of polyvinylacetal

Example 9 was repeated except that polyvinylalcohol having a degree of polymerization of 500 and a degree of saponification of 99.2 mole % was used.

(B) Molding of the polyvinylacetal and the evaluation of its properties were carried out in the same way as in Example 9.

The results obtained in Examples 16 to 19 are summarized in Table 3.

EXAMPLE 17

(A) Preparation of polyvinylacetal

Example 9 was repeated except that the same polyvinylalcohol as used in Example 16 was used, and 90 g of cyclohexanealdehyde was used instead of the isobutylaldehyde.

(B) Molding of the polyvinylacetal and the evaluation of its properties were carried out in the same way as in Example 9.

EXAMPLE 18

(A) Preparation of polyvinylacetal

Example 9 was repeated except that polyvinylalcohol having a degree of polymerization of 800 and a degree of saponification of 99.5 mole % was used, and 101 g of 3-methylcyclohexanealdehyde was used instead of isobutylaldehyde.

(B) Molding of the polyvinylacetal and the evaluation of its properties were carried out in the same way as in Example 9.

EXAMPLE 19

(A) Preparation of polyvinylacetal

Example 9 was repeated except that 45 g of cyclohexanealdehyde and 51 g of 3-methylcyclohexanealdehyde were used instead of isobutylaldehyde.

(B) Molding of the polyvinylacetal and the evaluation of its properties were carried out in the same way as in Example 9.

TABLE 3

| | Polyvinylalcohol | | | Degree of acetalization (mole %) | Properties of the molded article | | | | | |
|---|---|---|---|---|---|---|---|---|---|---|
| Example | D. P. | Amount of residual acetyl groups (mole %) | Aldehyde | | Warpage (mm) | Water absorption (%) | Total light transmittance (%) | Haze value | Birefringence | Heat distortion temperature (°C.) |
| 16 | 500 | 99.2 | Isobutylaldehyde<br>Cyclohexanealdehyde | 34<br>49 | 0.7 | 0.6 | 91.1 | 0.6 | None | 81 |
| 17 | 500 | 99.2 | Cyclohexanealdehyde | 61 | 0.5 | 0.9 | 90.2 | 0.9 | None | 86 |
| 18 | 800 | 99.5 | 3-Methylcyclohexanealdehyde | 61.5 | 0.5 | 0.8 | 91.2 | 1.0 | None | 82 |
| 19 | 800 | 99.5 | 3-Methylcyciohexanealdehyde<br>Cyclohexanealdehyde | 30.5<br>31 | 0.5 | 0.8 | 91.4 | 1.1 | None | 84 |

EXAMPLE 20

(A) Synthesis of polyvinyl acetal

One hundred kilograms of polyvinyl alcohol having a degree of saponification of 99.2% and a degree of polymerization of 1500 was dissolved in 880 kg of distilled water. 5.7 kg of concentrated hydrochloric acid was added to this solution and then 44.8 kg of cyclohexanealdehyde was added dropwise over 15 minutes with maintaining the temperature of the solution at 14.4° C. In 10 minutes after the addition, polyvinyl butyral precipitated. 63.5 kg of cyclohexanealdehyde was further added, and this reaction system was heated and maintained at 40° C. for 10 hours. The temperature was then lowered and the reaction system was neutralized by sodium bicarbonate. The resulting polyvinyl acetal resin was washed with water and dried at 70° C. for 48 hours.

(B) Molding of polyvinyl acetal resin and evaluation of its properties

The resin obtained above was molded into optical discs substrate by a toggle type injection molding machine Model S165/75 made by Sumitomo Heavy Ind., Ltd. Actually, this molding machine was equipped with a stamper in which a certain music sound signals were stored and compact disks for music reproduction were molded.

The molding conditions are as follows.
Injection temperature: 260° C. to 320° C.
Charge time: 0.3 to 05 second
Mold temperature: 70° C. to 80° C.
Dwell pressure: 3.6 to 12.4 kg/cm$^2$ Shape and properties of disks Outer diameter of disk: 120φ
Inner diameter of disk: 15φ
Thickness of disc: 1.2 mm
Track pitch: 1.67μ
Depth of pit: 0.11μ
Length of pit: 0.9 to 3.3μ
Width of pit: 0.5μ

This relationship between the injection molding temperatures and birefringence for the resin of this Example is shown in FIG. 1. In addition, the disc substrate molded at 310° C. showed slight coloring and flaws. However, these did not occur in the disc substrates molded at temperatures of not higher than 300° C.

(C) Method of measurement of birefringence

The measurement of birefringence in this Example was carried out in the following method. The same was also done in the following Examples.

An optical disc substrate was divided into five equal portions and five points (23, 30, 45, 50 and 57 cm apart from the center) in each portion, totalling 25 points, were selected as points of measurement and the measurements were made in these points of measurement by an automatic birefringence measuring device (made by Mizojiri Optical Co., Ltd.). Measured values were indicated by + or −. Accordingly, when all the 25 points were indicated singly by either + or −, its maximum value was taken as the maximum birefringence, and when + and − were indicated mixedly, the difference between + maximum value and − minimum value was taken as the maximum birefringence.

The maximum birefringence value allowable in rerecordable optical discs is not particularly standardized, the maximum birefringence of not higher than about 10, measured at double pass, is said to be allowable. Accordingly, the above results show that substrates can be suitably molded for rerecordable use in the range of 270° C. to 300° C.

(D) Preparation of optical discs

Aluminum was vacuum-deposited in a thickness of 1500 Å on the surface having music sound reproduction signal pits in the resulting optical disc substrates under the condition of $10^{-5}$ Torr to give optical discs.

(E) Thermal resistance test

Regarding the resulting optical disc, the disc subjected to a heat resistance test (50° C., 40% RH) and the disc subjected to a moisture resistance test (40° C., 100% RH), the flatness was measured and music sound information was detected, and the results are shown in Table 4.

TABLE 4

|  | Flatness* | Music information** |
| --- | --- | --- |
| Prior to thermal resistance test | +0.16 mm, −0.22 mm | 61 minutes |
| 6 months passed in thermal | +0.21 mm, −0.22 mm | 61 minutes |

TABLE 4-continued

|  | Flatness* | Music information** |
| --- | --- | --- |
| resistance test |  |  |

*The measurement of flatness was carried out according to the method of optical interference by a flatness measuring machine model FT3C made by Nidk Co., Ltd. The values indicate each maximum value on the + side and − side of one disc. The value slightly increased on the + side, which, however, is at the level of no significance. (The + side indicates a convex state from the recording surface and the − side a concave state from the recording surface.)
**The music sound information was measured as follows. The above disc was inserted into an audio compact disc player (made by Nippon Electric Co., Ltd., model CD5-803) to reproduce music. Generally when the disc is subjected to a thermal resistance test or moisture resistance test, it warps to a greated extent (especially in the outer area), which thus causes a focus error and it becomes impossible to reproduce music sound information.

Accordingly, whether the sound information can be picked up at the initial stage (or in the inner area), the focus error is hardly modified as the warp becomes larger. The above table shows that even if a compact disc in which a 61 minutes long sound information is input is stored under the conditions of 50° C. and 40% RH, the original sound information can be correctly reproduced.

An audio compact disc is taken up as an example here for simplification. However, as far as a video disc having a disc diameter of 300φ, a DRAW type disc of which severity on an information error is rquired and a record-erasable disc are concerned, these subjects are more significant.

(F) Moisture resistance test

While the above optical discs were maintained under the conditions of 40° C. and 100% RH, the flatness was measured and the music sound information was detected. The results are shown in Table 5.

TABLE 5

|  | Flatness | Music information |
| --- | --- | --- |
| Prior to moisture resistance test | +0.15 mm, −0.21 mm | 61 minutes |
| 6 months passed in moisture resistance test | +0.22 mm, −0.23 mm | 61 minutes |

The values found in the above test are a little greater than those found in the thermal resistance test, but scarcely affect the picking-up of the sound information.

EXAMPLE 21

The acetalization of Example 20 was carried out by the use of 50.4 kg of 4-methylcyclohexanealdehyde in place of 44.8 kg of cyclohexanealdehyde added at its earlier step and 71.4 kg of 4-methylcyclohexanealdehyde in place of 63.5 kg of cyclohexanealdehyde added at its later step. The injection molding, vacuum vapor deposition, thermal resistance test and moisture resistance test were carried out under the same conditions as in Example 20. The results are shown in Table 6.

TABLE 6

|  | Flatness | Music information |
| --- | --- | --- |
| Prior to thermal resistance test | +0.15 mm, −0.21 mm | 61 minutes |
| 6 months passed in thermal resistance test | +0.16 mm, −0.21 mm | 61 minutes |
| Prior to moisture resistance test | +0.17 mm, −0.22 mm | 61 minutes |
| 6 months passed in moisture | +0.19 mm, −0.25 mm | 61 minutes |

TABLE 6-continued

| | Flatness | Music information |
|---|---|---|
| resistance test | | |

Figure 2:
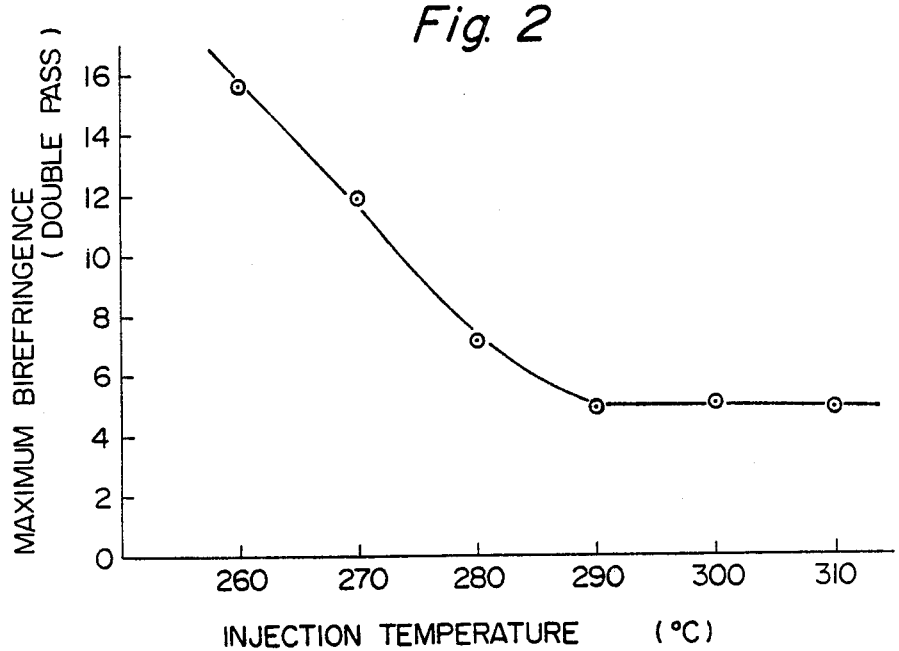
Figure 3:
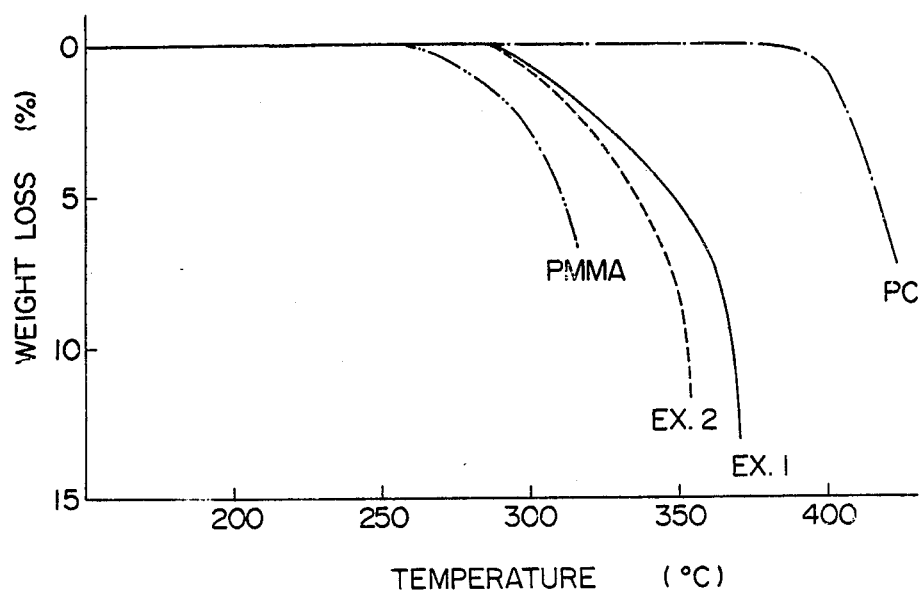
FIG. 3 depicts the relationship between weight loss and temperature for certain resins of the Examples and comparative Examples of the preent specification.

The relationship between injection molding temperature, maximum birefringence and appearance for this resin is as shown in FIG. 2. Disc molded at 310° C. took on color to some extent and recognizable flows were there.

The above results show that the flatness did not change through both the thermal resistance test and the moisture resistance test and the reproductions of music sound information were correctly made from the initial stage to the last.

With regard to the maximum birefringence, it is also seen that substrates for rerecordable optical discs can be molded at temperatures from 280° C. to 300° C.

The thermal weight loss of the resins obtained in Examples 20 and 21, polymethylmethacrylate (Comparative Example 3) and polycarbonate (Comparative Example 4) were respectively measured by the use of a thermal microbalance analyzer (at the rate of temperature increase of 6° C. per minute).

According to the results of the above measurements, the thermal weight loss of the resins in Examples 21 and 22 was not more than 1% at a temperature of not higher than 300° C. Namely, the injection molding temperature ranges are as shown in Table 7.

TABLE 7

| Resin | Temperature at which thermal weight loss is not higher than 1% |
|---|---|
| Example 20 | not higher than 300° C. |
| Example 21 | not higher than 300° C. |
| PMMA (Comp. Ex 3) | not higher than 280° C. |
| PC (Comp. Ex. 4) | not higher than 400° C. |

COMPARATIVE EXAMPLE 3

Figure 4:
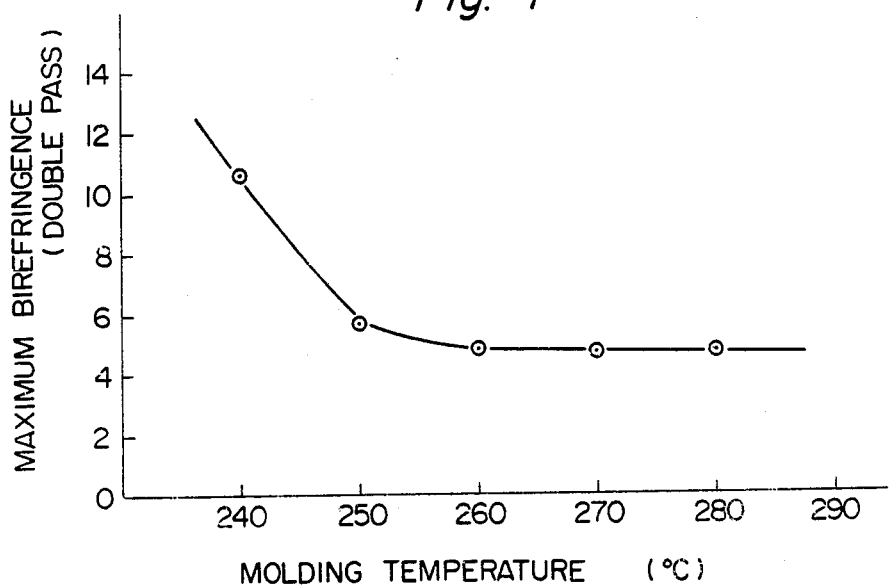
FIGS. 4 and 5 depict the relationship between injection molding temperature and maximum birefringence for certain resins of Comparative Examples of the present specification.

By the use of polymethylmethacrylate commercially graded for optical discs (a product of Kyowa Gaschemical Co., Ltd., parapet F1000), Example 20 was repeated except for the injection molding temperature range indicated in FIG. 4 for the measurement of maximum birefringence, preparation of optical discs by vacuum deposition and measurement of thermal resistance and moisture resistance. The results are shown in Table 8 and FIG. 4.

TABLE 8

| | Flatness | Music information |
|---|---|---|
| Prior to thermal resistance test | +0.15 mm, −0.19 mm | 61 minutes |
| 6 months passed in thermal resistance test | +0.22 mm, −0.35 mm | 61 minutes |
| Prior to moisture resistance test | +0.14 mm, −0.21 mm | 61 minutes |
| 20 days passed in moisture resistance test | +0.96 mm, −2.26 mm | 12 minutes |

FIG. 4 shows the relationship of this resin between the maximum birefringence and the molding temperature for this resin. Low values of birefringence were found at each temperature. Each sample is applicable to discs for rerecordable discs.

In the thermal resistance test, the warpage of the disks prepared in this Example was a little larger than that in Examples 19 and 20, which, however, can be judged to be at the level at which the picking-up of music sound information is not affected. However, in the moisture resistance test, since the flatness changed to a great extent when 20 days passed, music sound information could not be reproduced in 12 minutes from the time reproduction started.

COMPARATIVE EXAMPLE 4

By the use of polycarbonate (PANLITE AD5503, a product of Teijin Kasei K.K.) commercially graded for optical discs, Example 20 was repeated except for the injection molding temperature range indicated in FIG. 4 for the measurement of maximum birefringence, preparation of optical discs by vacuum deposition and measurement of thermal resistance and moisture resistance. The results are shown in Table 9 and FIG. 5.

TABLE 9

| | Flatness | Music information |
|---|---|---|
| Prior to thermal resistance test | +0.16 mm, −0.20 mm | 61 minutes |
| 6 months passed in thermal resistance test | +0.17 mm, −0.24 mm | 61 minutes |
| Prior to moisture resistance test | +0.14 mm, −0.18 mm | 61 minutes |
| 6 months passed in moisture resistance test | +0.13 mm, −0.21 mm | 61 minutes |

Figure 5:
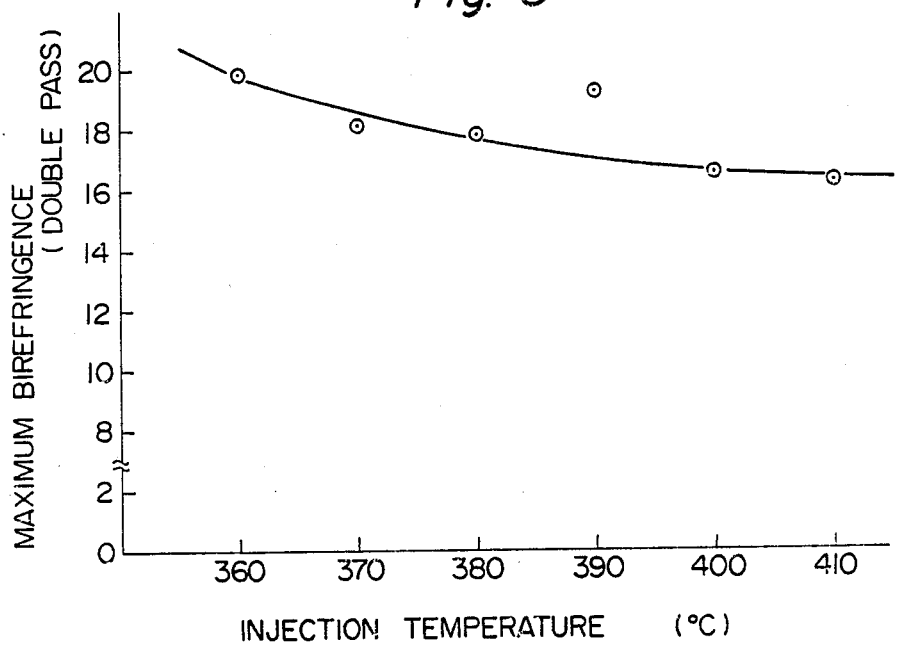

FIG. 5 shows the relations of this resin between the birefringence and injection molding temperature. The reulsts showed a high birefringence of around 18. Substrates cannot be used for rerecordable discs.

The thermal resistance test nd moisture resistance test all showed good results.

What is claimed is:

1. A process for preparing a substrate for optical recording media free from birefringence which comprises injection-molding a polyvinylacetal resin resulting from acetalization of polyvinylalcohol to a degree of at least 60 mole % with at least one alicyclic aldehyde wherein the polyvinyl acetal resin temperature in injection molding is 270° to 300° C., the polyvinylalcohol has a degree of polymerization of 100 to 2,500 and the polyvinyl alcohol has a degree of saponification of at least 95 mole %.

2. The process of claim 1 wherein the alicyclic aldehyde is selected from the group consisting of cyclohexanealdehyde, trimethylcyclohexanealdehyde, dimethylcyclohexanealdehyde, methylcyclohexanealdehyde, cyclopentanealdehyde, methylcyclopentanealdehyde, decahydro-beta-naphthaldehyde, cyclohexanecetaldehyde, alpha-camphorenealdehyde, phellandral, cyclocitral, trimethyltetrahydrobenzaldehyde, alpha-pyrronenealdehyde, myrtenal, dihydromyrtenal, camphenilanealdehyde, 4-methylcyclchexenealdehyde and 3-methylcyclohexenealdehyde.

* * * * *